(12) United States Patent
Yi et al.

(10) Patent No.: US 12,347,824 B2
(45) Date of Patent: *Jul. 1, 2025

(54) SEPARATOR AND ENERGY STORAGE DEVICE

(71) Applicant: Ningde Amperex Technology Limited, Fujian (CN)

(72) Inventors: Jianjian Yi, Fujian (CN); Xinzhi Zhang, Fujian (CN); Zengbin Wei, Fujian (CN); Xinghua Tao, Fujian (CN)

(73) Assignee: Ningde Amperex Technology Limited, Ningde (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/303,042

(22) Filed: Apr. 19, 2023

(65) Prior Publication Data

US 2023/0261250 A1 Aug. 17, 2023

Related U.S. Application Data

(63) Continuation of application No. 17/178,843, filed on Feb. 18, 2021, which is a continuation of application
(Continued)

(30) Foreign Application Priority Data

Apr. 11, 2018 (CN) .......................... 201810321779.5

(51) Int. Cl.
*H01M 50/403* (2021.01)
*H01M 10/0525* (2010.01)
(Continued)

(52) U.S. Cl.
CPC ..... *H01M 10/0525* (2013.01); *H01M 50/403* (2021.01); *H01M 50/417* (2021.01);
(Continued)

(58) Field of Classification Search
CPC ............... H01M 10/0525; H01M 50/403–491
See application file for complete search history.

(56) References Cited

U.S. PATENT DOCUMENTS 7,662,517 B2 2/2010 Lee et al.
7,976,987 B2 7/2011 Nishikawa et al.
(Continued)

FOREIGN PATENT DOCUMENTS

CN 1882436 A 12/2006
CN 101689624 3/2010
(Continued)

OTHER PUBLICATIONS

Notice of Filing Date Accorded to Petition and Time for Filing Patent Owner Preliminary Response issued on Mar. 29, 2023, in corresponding U.S. Pat. No. 10,964,987, 7 pages.
(Continued)

*Primary Examiner* — Osei K Amponsah
(74) *Attorney, Agent, or Firm* — Maier & Maier, PLLC

(57) ABSTRACT

An energy storage device includes a separator, the separator includes a porous substrate, and a porous layer arranged on a surface of the porous substrate. The porous layer comprises inorganic particles and a binder, and a ratio of Dv90 of the inorganic particles to the thickness of the porous layer is in a range from 0.3 to 3.0. Excellent adhesion exists between the separator and the electrode according to the present application, which ensures that the energy storage device has good safety performance. Moreover, the rate performance and cycle performance of the energy storage device can be greatly improved due to the existence of inorganic particles in the separator.

21 Claims, 2 Drawing Sheets

Related U.S. Application Data

No. 16/013,887, filed on Jun. 20, 2018, now Pat. No. 10,964,987.

(51) Int. Cl.

| | |
|---|---|
| H01M 50/417 | (2021.01) |
| H01M 50/426 | (2021.01) |
| H01M 50/431 | (2021.01) |
| H01M 50/434 | (2021.01) |
| H01M 50/443 | (2021.01) |
| H01M 50/446 | (2021.01) |
| H01M 50/451 | (2021.01) |
| H01M 50/491 | (2021.01) |

(52) U.S. Cl.
CPC ....... *H01M 50/426* (2021.01); *H01M 50/431* (2021.01); *H01M 50/434* (2021.01); *H01M 50/443* (2021.01); *H01M 50/446* (2021.01); *H01M 50/451* (2021.01); *H01M 50/491* (2021.01)

(56) References Cited

U.S. PATENT DOCUMENTS

| | | | |
|---|---|---|---|
| 8,318,360 | B2 | 11/2012 | Seo et al. |
| 9,172,074 | B2 | 10/2015 | Weber et al. |
| 9,190,668 | B2 | 11/2015 | Ueki et al. |
| 10,964,987 | B2 | 3/2021 | Yi et al. |
| 2006/0008700 | A1 | 1/2006 | Yong et al. |
| 2009/0155678 | A1 | 6/2009 | Less et al. |
| 2010/0173187 | A1 | 7/2010 | Nishikawa et al. |
| 2010/0221965 | A1 | 9/2010 | Katayama et al. |
| 2011/0052987 | A1 | 3/2011 | Katayama et al. |
| 2011/0171514 | A1 | 7/2011 | Nishikawa et al. |
| 2011/0171535 | A1 | 7/2011 | Ohinshi et al. |
| 2011/0293976 | A1 | 12/2011 | Chiba et al. |
| 2012/0202102 | A1 | 8/2012 | Kakibe et al. |
| 2013/0084503 | A1 | 4/2013 | Ueki et al. |
| 2014/0248525 | A1 | 9/2014 | Iwai et al. |
| 2015/0017511 | A1 | 1/2015 | Schmitz et al. |
| 2015/0255771 | A1 | 9/2015 | Yu |
| 2015/0263325 | A1 | 9/2015 | Honda et al. |
| 2015/0270522 | A1 | 9/2015 | Yamada et al. |
| 2015/0280195 | A1 | 10/2015 | Schmitz et al. |
| 2016/0013465 | A1 | 1/2016 | Akiike |
| 2017/0155106 | A1 | 6/2017 | Arise et al. |
| 2018/0123107 | A1 | 5/2018 | Yu et al. |
| 2019/0123319 | A1* | 4/2019 | Shimura ............ H01M 50/414 |
| 2019/0305278 | A1 | 10/2019 | Saeki et al. |
| 2019/0319243 | A1 | 10/2019 | Yi et al. |
| 2019/0355953 | A1* | 11/2019 | Nam ................... H01M 50/491 |

FOREIGN PATENT DOCUMENTS

| | | |
|---|---|---|
| CN | 101828283 | 9/2010 |
| CN | 102468466 | 5/2012 |
| CN | 102939675 | 2/2013 |
| CN | 103155217 A | 6/2013 |
| CN | 103474602 A | 12/2013 |
| CN | 104091910 | 10/2014 |
| CN | 104999745 A | 10/2015 |
| CN | 205004376 U | 1/2016 |
| CN | 110212140 A | 9/2019 |
| CN | 110364661 A | 10/2019 |
| CN | 110364661 A | 10/2019 |
| EP | 2116372 | 11/2009 |
| KR | 20140072111 | 6/2014 |
| WO | 2009151054 | 12/2009 |
| WO | 2014179355 | 11/2014 |
| WO | 2017187780 A1 | 11/2017 |
| WO | 2017183633 | 2/2019 |

OTHER PUBLICATIONS

Besenhard, "Handbook of Battery Materials", Wiley-VCH Verlag GmbH, 1999, 633 pages.
Sigma-Aldrich, "Safety Data Sheet for Aluminium hydroxide fine powder pure, hydrargillite", 2021, 8 pages.
Sigma-Aldrich, "Safety Data Sheet for Poly[N,N'-(1,3-phenylene)isophthalamide]", 2021, 7 pages
Patnaik, "Handbook of Inorganic Chemicals", McGraw-Hill, 2003, 1125 pages.
Ahmad et al., "Synthesis of Polyvinylidene Fluoride (PVDF) Membranes for Protein Binding: Effect of Casting Thickness", Journal of Applied Polymer Science, 2012, 8 pages.
Yi, Jianjian; Advisory Action for U.S. Appl. No. 16/013,887, filed Jun. 20, 2018, mailed Jun. 29, 2020, 5 pages.
Yi, Jianjian; Notification to Grant for Chinese Application No. 201810321779.5, filed Apr. 11, 2018, mailed Aug. 22, 2022, 3 pages.
Yi, Jianjian; Second Office Action for Chinese Application No. 201810321779.5, filed Apr. 11, 2018, mailed Feb. 18, 2022, 22 pages.
Yi, Jianjian; Supplementary Search for Chinese Application No. 201810321779.5, filed Apr. 11, 2018, mailed Aug. 12, 2022, 6 pages.
Yi, Jianjian; First Office Action for Chinese Application No. 201810321779.5, filed Apr. 11, 2018, mailed Aug. 4, 2021, 14 pages.
Yi, Jianjian; Restriction Requirement for U.S. Appl. No. 16/013,887, filed Jun. 20, 2018, mailed Nov. 7, 2019, 6 pages.
Yi, Jianjian; Non-Final Office Action for U.S. Appl. No. 16/013,887, filed Jun. 20, 2018, mailed Jan. 15, 2020, 6 pages.
Yi, Jianjian; Final Office Action for U.S. Appl. No. 16/013,887, filed Jun. 20, 2018, mailed Apr. 20, 2020, 7 pages.
Yi, Jianjian; Non-Final Office Action for U.S. Appl. No. 16/013,887, filed Jun. 20, 2018, mailed Aug. 4, 2020, 9 pages.
Yi, Jianjian; Notice of Allowance for U.S. Appl. No. 16/013,887, filed Jun. 20, 2018, mailed Dec. 18, 2020, 11 pages.
Yi, Jianjian; Supplemental Notice of Allowance for U.S. Appl. No. 16/013,887, filed Jun. 20, 2018, mailed Jan. 22, 2021, 13 pages.
Office Action issued on Oct. 26, 2023, in related U.S. Appl. No. 17/178,843, 10 pages.
Petition for Inter Partes Review dated Feb. 24, 2023, in related U.S. Pat. No. 10,964,987, 78 pages.
First Amended Complaint for Patent Infringement dated Aug. 4, 2022, in related Civil Action No. 2:22-cv-232, 18 pages.
Curriculum Vitae of Samuel P. Gido, Ph.D., dated Feb. 22, 2023, in related U.S. Pat. No. 10,964,987, 30 pages.
Declaration of Samuel P. Gido, Ph.D. dated Feb. 22, 2023, in related U.S. Pat. No. 10,964,987, 512 pages.
Notice of Request for Ex Parte Reexamination dated Apr. 4, 2024, in related U.S. Pat. No. 10,964,987, 123 pages.
Decision on Denying Institution of Inter Partes Review dated Sep. 22, 2023, in related U.S. Pat. No. 10,964,987, 362 pages.
Declaration of Menahem Anderman, Ph.D. dated Apr. 4, 2024, in related U.S. Pat. No. 10,964,987, 109 pages.
Curriculum Vitae of Menahem Anderman, Ph.D, dated Apr. 4, 2024, in related U.S. Pat. No. 10,964,987, 13 pages.
"Particle Size Analysis—Laser Diffraction Methods—Part 1: General Principles", International Organization for Standardization, First Edition, 1999, in related U.S. Pat. No. 10,964,987, 42 pages.
Declaration of Ingrid Hsieh-Yee, Ph.D. dated Mar. 29, 2024, in related U.S. Pat. No. 10,964,987, 19 pages.
Curriculum Vitae of Ingrid Hsieh-Yee, Ph.D., dated Mar. 29, 2024, in related U.S. Pat. No. 10,964,987, 21 pages.
Claim Construction Memorandum Opinion and Order dated Oct. 18, 2023, in related Civil Action No. 2:22-CV-00232-JRG, 16 pages.
Microtrac MRB, "A New Leader in Particle Characterization", available at www.microtrac.com, dated Apr. 4, 2024, in related U.S. Pat. No. 10,964,987, 16 pages.
"Porous Definition and Meaning", Merriam-Webster Dictionary, dated Feb. 22, 2024, in related U.S. Pat. No. 10,964,987, 2 pages.
Decision on Denying Institution of Inter Partes Review dated Sep. 22, 2023, in related U.S. Pat. No. 10,964,987, 28 pages.

(56) References Cited

OTHER PUBLICATIONS

Office Action issued on Sep. 30, 2024, in related U.S. Appl. No. 17/178,843, 23 pages.
Office Action issued on Mar. 6, 2025, in corresponding Chinese Application No. 202211401984.5, 20 pages.

* cited by examiner

SEPARATOR AND ENERGY STORAGE DEVICE

CROSS REFERENCE TO RELATED APPLICATIONS

This is a continuation application of patent application Ser. No. 17/178,843, filed on Feb. 18, 2021, which is a continuation application of patent application Ser. No. 16/013,887, filed on Jun. 20, 2018, assigned to the same assignee, which is based on and claims priority to China Patent Application No. 201810321779.5 filed on Apr. 11, 2018, the contents of which are incorporated by reference herein.

TECHNICAL FIELD

The application relates to the field of energy storage devices, and in particular, to a separator and an energy storage device.

BACKGROUND

Non-aqueous secondary batteries, particularly lithium-ion batteries, are widely used in portable electronic devices such as notebook computers, digital cameras, camcorders, and cellphones, due to their high energy density and good rate performance. In recent years, the application of lithium-ion batteries as the power supply for electrical vehicles, is also promoting the development of lithium-ion battery technology. In the cycle process of the lithium-ion battery, with the progress of charging and discharging, there will be a gap between the electrode and the separator, resulting in a reduction of the cycle capacity of the lithium-ion battery and thereby having an influence on its service life. Therefore, there is an urgent need for a technical solution to solve the problem of the gap between the separator and the electrode so as to improve the service life of the lithium-ion battery.

SUMMARY

A separator and an energy storage device are provided according to the present application. With the separator provided by the application, not only the problem of the gap between the separator and the electrode can be solved, but also excellent adhesive force between the separator and the electrode can be maintained; moreover, the rate performance and cycle performance of the energy storage device can be improved due to the pore structures maintained in the separator of the application.

A separator is provided according to an example of the present application. The separator comprises: a porous substrate; and a porous layer arranged on a surface of the porous substrate, wherein the porous layer comprises inorganic particles and a binder, and a ratio of Dv90 of the inorganic particles to the thickness of the porous layer is in a range of 0.3 to 3.0. The Dv90 of the inorganic particles refers to a particle size which reaches 90% the cumulative volume from the side of small particle size in the granularity distribution on a volume basis.

In the above-described separator, the porous layer has a thickness of 0.2 μm to 10 μm.

In the above-described separator, the porous layer has pores formed by the binder, and the inorganic particles are distributed in the pores.

In the above-described separator, the pores have an average pore size of 0.3 μm to 20 μm.

In the above-described separator, the volume ratio of the inorganic particles to the binder is in a range from 0.2 to 3.0.

In the above-described separator, the porous layer has a porosity of 20% to 90%.

In the above-described separator, the inorganic particles are one or more selected from the group consisting of alumina, silica, magnesia, titanium oxide, hafnium dioxide, tin oxide, zirconia, cerium dioxide, nickel oxide, zinc oxide, calcium oxide, boehmite, aluminum hydroxide, magnesium hydroxide, calcium hydroxide, and barium sulfate.

In the above-described separator, the binder is one or more selected from the group consisting of polyvinylidene fluoride, vinylidene fluoride-hexafluoropropylene copolymer, polyamide, polyacrylonitrile, polyacrylate, polyacrylic acid, polyacrylates, sodium carboxymethylcellulose, polyvinylpyrrolidone, polyvinyl ether, polymethyl methacrylate, polytetrafluoroethylene and polyhexafluoropropylene.

An energy storage device is further provided according to the present application, which comprises the above-described separator.

In the above-described energy storage device, the energy storage device is a lithium-ion battery.

A method for preparing a separator is further provided according to the present application, the method comprising the steps of:

mixing inorganic particles with a binder to generate a mixture, and adding a first solvent into the mixture and stirring the mixture with the first solvent to obtain an uniform coating solution; coating the uniform coating solution onto a surface of a porous substrate to form a wet film; immersing the wet film into a coagulating solution for phase transformation; and drying the phase-transformed wet film to obtain the separator.

In the above-described method, the solid content in the coating solution is in a range of 7% to 25%.

In the above-described method, the coagulating solution comprises a second solvent and a third solvent, and the second solvent has a mass percentage of 20% to 60%.

In the above-described method, the first solvent is one or more independently selected from the group consisting of N-methylpyrrolidone (NMP), dimethylacetamide (DMAC) and dimethylformamide (DMF).

In the above-described method, the porous substrate comprises a polymer film, a multilayer polymer film, or a non-woven fabric formed of any one or more of the following polymers: polyethylene, polypropylene, polyethylene terephthalate, polyphthaloyl diamine, polybutylene terephthalate, polyester, polyacetal, polyamide, polyimide, polyetheretherketone, polyaryletherketone, polyetherimide, polyamide imide, polybenzimidazole, polyethersulfone, polyphenylene oxide, cycloolefin copolymer, polyphenylene sulfide, and polyethylene naphthalene.

In the above-described method, the polyethylene is at least one component selected from the group consisting of high density polyethylene, low density polyethylene, and ultrahigh molecular weight polyethylene.

In the above-described method, the second solvent is one or more independently selected from the group consisting of N-methylpyrrolidone, dimethylacetamide and dimethylformamide, and the third solvent is one or more selected from the group consisting of deionized water, ethanol, propanol, acetone, dimethyl carbonate and diethyl carbonate.

An excellent adhesion exists between the separator and the electrode according to the present application, thus ensuring that the energy storage device has good safety performance. Moreover, the porous layer is arranged on a surface of the separator, and the inorganic particles contained in the pores in the porous layer can serve to support the pores, and therefore the pores can be well protected from being destroyed. As such, the probability of pore blockage due to compression and swelling in the separator is reduced, the separator would exhibit high ionic conductivity, and the rate performance and cycle performance of the energy storage device are greatly improved.

DETAILED DESCRIPTION

Figure 1:
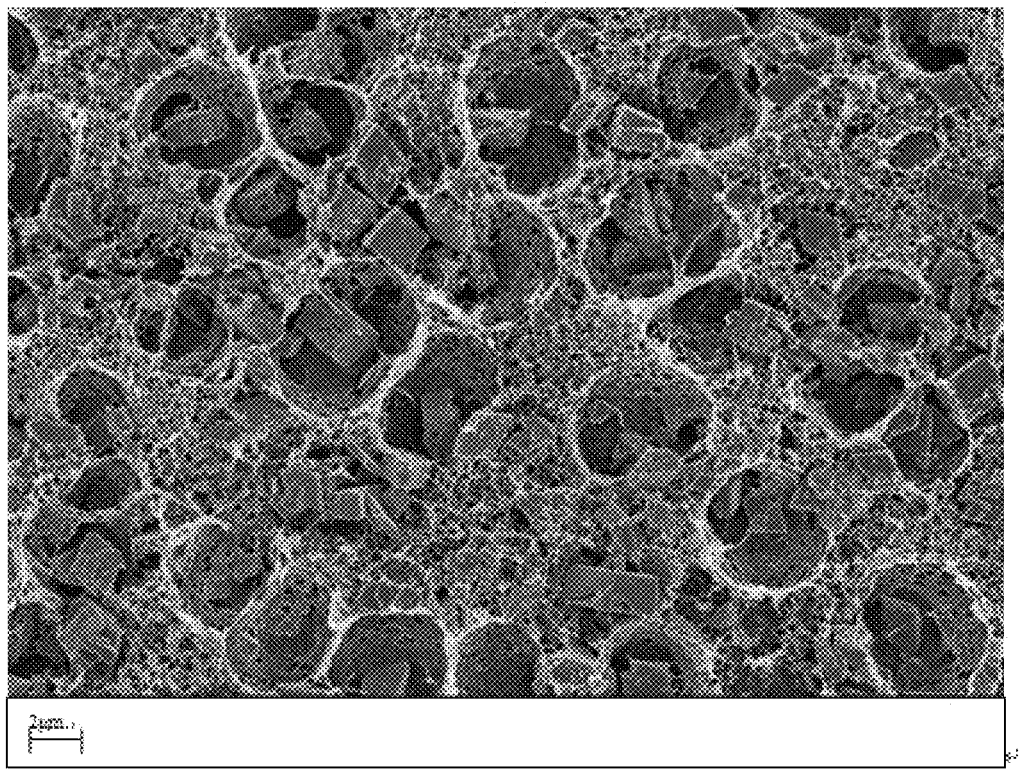
FIG. 1 is an electronic microscope image (3000 times magnification) of pores of the lower surface of the porous layer (i.e., the surface of the porous layer that is away from the porous substrate) in example 3.

Exemplary examples will be described in details. While these exemplary examples may be implemented in various forms, the application should not be construed as limited to the examples of the application set forth herein. Rather, these examples are provided with the purpose of making the disclosure of the application thorough and complete and fully conveying the scope of the application to those skilled in the art.

A separator and a preparation method thereof as well as an energy storage device according to the present application will be described in details hereinafter.

In a first aspect of the application, the separator comprises a porous substrate and a porous layer. The porous layer is arranged on a surface of the porous substrate. Specifically, the porous layer is arranged on one surface of the porous substrate, or the porous layer is arranged on both surfaces of the porous substrate, or the porous layer is arranged on part of the surface of the porous substrate. The porous substrate comprises a polymer film, a multilayer polymer film, or a non-woven fabric formed of any one or more of the following polymers: polyethylene, polypropylene, polyethylene terephthalate, polyphthaloyl diamine, polybutylene terephthalate, polyester, polyacetal, polyamide, polyimide, polyetheretherketone, polyaryletherketone, polyetherimide, polyamide imide, polybenzimidazole, polyethersulfone, polyphenylene oxide, cycloolefin copolymer, polyphenylene sulfide, and polyethylene naphthalene. The above-mentioned polyethylene is at least one component selected from the group consisting of high density polyethylene, low density polyethylene, and ultrahigh molecular weight polyethylene.

In an example of the application, the porous layer arranged on the porous substrate comprises a binder and inorganic particles. The porous layer has pores formed by the binder, and the pores at least comprises a part of the inorganic particles. A ratio of Dv90 of the inorganic particles to the thickness of the porous layer is in a range from 0.3 to 3.0. The Dv90 of the inorganic particles refers to a particle size which reaches 90% the cumulative volume from the side of small particle size in the granularity distribution on a volume basis. The binder is one or more selected from the group consisting of polyvinylidene fluoride, vinylidene fluoride-hexafluoropropylene copolymer, polyamide, polyacrylonitrile, polyacrylate, polyacrylic acid, polyacrylates, sodium carboxymethylcellulose, polyvinylpyrrolidone, polyvinyl ether, polymethyl methacrylate, polytetrafluoroethylene and polyhexafluoropropylene. The binder can provide a sufficient binding interface for the electrode, thus ensuring a high adhesive force between the separator and the electrode, and enabling the energy storage device (such as a lithium-ion battery) to have a high safety performance.

The pores in the porous layer allow the separator to have good electrolyte diffusion and absorption capabilities, improving the ionic conductivity of the separator, and thereby improving the rate performance of the energy storage device (such as a lithium-ion battery). The average pore size of the porous layer is not less than 0.3 μm, which makes the separator have good electrolyte diffusion and absorption capabilities, improves the ionic conductivity of the separator, reduces the polarization reaction, and thus can improve the rate performance of the energy storage device (such as a lithium-ion battery). The porous layer may have a porosity of 20% to 90%.

The inorganic particles distributed in the pores of the porous layer provide a good mechanical support for the porous layer, preventing the porous layer from compressing and collapsing during processing the energy storage device (such as a lithium-ion battery), and preventing the porous layer from being compressed and destroyed. Inorganic particles refer to a class of inorganicmaterials obtained from natural or synthetic compounds through the process of shaping and high-temperature sintering or the like. The inorganic particles are one or more selected from the group consisting of alumina, silica, magnesia, titanium oxide, hafnium dioxide, tin oxide, zirconia, cerium dioxide, nickel oxide, zinc oxide, calcium oxide, boehmite, aluminum hydroxide, magnesium hydroxide, calcium hydroxide, and barium sulfate. The inorganic particles may contain polar functional groups such as a hydroxyl group. The surface of the inorganic particles containing polar functional groups can be more easily combined with the non-solvent (third solvent) in the coagulating solution in the preparation process, which facilitates the diffusion of the non-solvent (third solvent) into the porous layer along the surface of the inorganic particles so that larger pores are formed in the vicinity of the inorganic particles, and the rate performance of the energy storage device (such as a lithium-ion battery) is thereby improved. The non-solvent (third solvent) in the coagulating solution will be described below.

In an example of the present application, the volume ratio of the inorganic particles to the binder in the porous layer is in a range from 0.2 to 3.0. An exchange between the first solvent in the coating solution and the third solvent in the coagulating solution can be increased by increasing the volume ratio of the inorganic particles to the binder, and the porosity of the porous layer is increased; conversely, if the volume ratio of the inorganic particles to the binder is reduced, the porosity of the porous layer will be decreased. If the volume ratio of the inorganic particles to the binder is too low, the average pore size of the porous layer will be decreased, and the porosity of the porous layer will be decreased; moreover, if the content of inorganic particles is decreased, the mechanical strength and heat resistance of the porous layer is decreased. If the volume ratio of the inorganic particles to the binder is too high, the adhesive force of the porous layer will be reduced, and the porous layer is easily detached from the surface of the porous substrate, resulting in deterioration of the safety performance of the energy storage device (such as a lithium-ion battery).

The porous layer has a thickness of 0.2 μm to 10 μm. If the thickness of the porous layer is too high, the gas permeability of the porous layer will be deteriorated, and the rate performance of the energy storage device (such as a lithium-ion battery) will be decreased. If the thickness of the porous layer is too low, the adhesive force of the porous layer will be reduced, a gap will easily occur between the separator and the electrode, and the hardness of the energy storage device (such as a lithium-ion battery) will be decreased, resulting in deterioration of the safety performance of the energy storage device (such as a lithium-ion battery).

In addition, in an example of the present application, pores having a larger average pore size can be obtained by controlling the ratio of Dv90 of the inorganic particles to the thickness of the porous layer. In the electrolyte environment, after the binder (such as polyvinylidene fluoride) in the porous layer swells, more through-holes can be retained, which avoids swelling and pore blockage, ensures a channel for ion transportation, reduces polarization reactions, and improves the rate performance of the energy storage device (such as a lithium-ion battery). The Dv90 of the inorganic particles refers to a particle size which reaches 90% the cumulative volume from the side of small particle size in the granularity distribution on a volume basis.

In some examples of the present application, the ratio of the Dv90 of the inorganic particles to the thickness of the porous layer is in a range from 0.4 to 1.5. By increasing the ratio of Dv90 of the inorganic particles to the thickness of the porous layer, the mechanical strength of the porous layer is increased, and the porous layer is prevented from undergoing pore blockage due to compression in the preparation or cycle process of the energy storage device (such as a lithium-ion battery), thereby increasing the rate performance of the energy storage device (such as a lithium-ion battery). Conversely, the mechanical properties of the porous layer may be reduced by reducing the ratio of Dv90 of inorganic particles to the thickness of the porous layer, leading to pore blockage of the porous layer due to compression in the preparation and cycle processes of the energy storage device (such as a lithium-ion battery), and the rate performance of the energy storage device (such as a lithium-ion battery) is reduced. In addition, if the ratio of the Dv90 of the inorganic particles to the thickness of the porous layer is too high, the pore size distribution of the porous layer tends to be non-uniform, resulting in a non-uniform surface of the porous layer, which further makes the porous layer easy to detach from the surface of the porous substrate and forms defects in the energy storage device (such as a lithium-ion battery). Moreover, if the ratio of Dv90 of the inorganic particles to the thickness of the porous layer is too high, the adhesive force of the porous layer is reduced, affecting the safety performance of the energy storage device (such as a lithium-ion battery). If the ratio of Dv90 of the inorganic particles to the thickness of the porous layer is too low, the inorganic particles cannot be effectively exposed on the surface of the porous layer, which does not facilitate an exchange between the first solvent in the coating solution and the third solvent in the coagulating solution in the preparation of the porous layer, therefore cannot enhance diffusion, and is not advantageous for the development of the pores.

The method for preparing the separator according to the present application is described below. Firstly, the inorganic particles are mixed with the binder, and then the first solvent is added into the mixture and the mixture is stirred to obtain a uniform coating solution, wherein the binder dissolves in the first solvent. The first solvent is one or more selected from the group consisting of N-methylpyrrolidone (NMP), dimethylacetamide (DMAC) and dimethylformamide (DMF). The porous layer formed using N-methylpyrrolidone (NMP) has the largest average pore size and the highest porosity; the porous layer formed using dimethylformamide (DMF) has the smallest average pore size and the lowest porosity; and the porous layer formed using dimethylacetamide (DMAC) has an average pore size and a porosity between those of the porous layer formed using N-methylpyrrolidone (NMP) and the porous layer formed using dimethylformamide (DMF). The temperature of the coating solution may be in a range from 15 degrees Celsius to 30 degrees Celsius. The solid content of the coating solution may be in a range from 7% to 25%. Within this range, if the solid content of the coating solution is increased, the viscosity of the coating solution is increased, the exchange rate between the third solvent in the coagulating solution and the first solvent in the coating solution becomes lower, and the average pore size and porosity of the formed porous layer are reduced; conversely, if the solid content of the coating solution is reduced, the average pore size and porosity of the porous layer are increased. However, if the solid content of the coating solution is too high and exceeds this range, the gas permeability of the porous layer does not meet the requirements and cannot satisfy the use for an energy storage device (such as a lithium-ion battery). If the solid content of the coating solution is too low, which is below this range, the strength of the porous layer is decreased, and it is difficult to form a film on the surface of the porous substrate.

Next, the coating solution is uniformly coated on the surface of the porous substrate to form a wet film. The coating method of the coating solution is dip coating. Meanwhile, any other suitable coating process may also be used.

Thereafter, the porous substrate with the wet film is immersed into a coagulating solution for phase transformation, wherein the coagulating solution may include a second solvent and a third solvent, and the second solvent and the third solvent are soluble with each other. The second solvent is one or more selected from the group consisting of N-methylpyrrolidone (NMP), dimethylacetamide (DMAC) and dimethylformamide (DMF), and the third solvent is one or more selected from the group consisting of deionized water, ethanol, propanol, acetone, dimethyl carbonate, and diethyl carbonate. The mass percentage of the second solvent in the coagulating solution may be in a range from 20% to 60%. The average pore size and porosity of the porous layer can be increased by decreasing the content of the second solvent in the coagulating solution. However, if the content of the second solvent is too low, a dense surface film may be formed on the surface of the porous layer that is away from the porous substrate, resulting in deterioration of the gas permeability of the porous layer. If the content of the second solvent is too high, complete pores cannot be formed, or the formed porous layer has a very low average pore size. The temperature of the coagulating solution may be in a range from 15 degrees Celsius to 30 degrees Celsius. The period for phase transformation may be in a range from 10s to 90s.

Finally, after the completion of the phase transformation, the wet film is dried to obtain a separator, wherein a porous layer is arranged on the surface of the porous substrate, and inorganic particles are distributed in the pores of the porous layer. The drying temperature may be in a range from 60 degrees Celsius to 70 degrees Celsius, and the drying period may be in a range from 10 minutes to 40 minutes.

According to some examples of the present application, a porous layer is prepared based on a phase transformation (i.e., non-solvent induced phase separation, NIPS) principle, wherein the first solvent in the coating solution is an organic solvent, and the binder (such as PVDF) can be dissolved in the first solvent. The coagulating solution contains a third solvent (deionized water), and the binder is insoluble in the third solvent (deionized water). Therefore, after the coating solution is coated on the porous substrate and then immersed into the coagulating solution, the first solvent in the coating solution is extracted into the third solvent (deionized water) in the coagulating solution, and the binder in the coating solution is solidified and precipitate to form a porous layer.

An energy storage device including the above-described separator is further provided according to the present application, such as a lithium-ion battery. In the application, the lithium-ion battery is only an illustrative example of the energy storage device, and the energy storage device may also comprise other suitable devices. The lithium-ion battery further comprises a positive electrode, a negative electrode, and an electrolyte, and the separator of the present application is placed between the positive electrode and the negative electrode. The positive current collector may be aluminum foil or nickel foil, and the negative current collector may be copper foil or nickel foil.

In the lithium-ion battery described above, the positive electrode comprises a positive electrode material capable of intercalation and deintercalation of lithium (Li) (hereinafter sometimes referred to as "positive electrode material capable of intercalation/deintercalation of lithium (Li)"). Examples of the positive electrode material capable of intercalation/deintercalation of lithium (Li) may include one or more of lithium cobaltate, lithium nickel cobalt manganate, lithium nickel cobalt aluminate, lithium manganate, lithium iron manganese phosphate, lithium vanadium phosphate, lithium vanadium oxide phosphate, lithium iron phosphate, lithium titanate, and lithium-rich manganese-based materials.

In the above-mentioned positive electrode material, the chemical formula of lithium cobaltate may be expressed as $Li_xCo_aM1_bO_{2-c}$, wherein M1 represents at least one selected from the group consisting of nickel (Ni), manganese (Mn), magnesium (Mg), aluminum (Al), boron (B), titanium (Ti), vanadium (V), chromium (Cr), ferrum (Fe), copper (Cu), zinc (Zn), molybdenum (Mo), tin (Sn), calcium (Ca), strontium (Sr), tungsten (W), yttrium (Y), lanthanum (La), zirconium (Zr), and silicon (Si), and the values of x, a, b, and c are respectively within the following ranges: $0.8 \leq x \leq 1.2$, $0.8 \leq a \leq 1$, $0 \leq b \leq 0.2$, $-0.1 \leq c \leq 0.2$.

In the above-mentioned positive electrode material, the chemical formula of lithium nickel cobalt manganate or lithium nickel cobalt aluminate may be expressed as $Li_yNi_dM2_eO_{2-f}$, wherein M2 represents at least one selected from the group consisting of cobalt (Co), manganese (Mn), magnesium (Mg), aluminum (Al), boron (B), titanium (Ti), vanadium (V), chromium (Cr), ferrum (Fe), copper (Cu), zinc (Zn), molybdenum (Mo), tin (Sn), calcium (Ca), yttrium (Sr), tungsten (W), zirconium (Zr), and silicon (Si), and the values of y, d, e, and f are respectively within the following ranges: $0.8 \leq y \leq 1.2$, $0.3 \leq d \leq 0.98$, $0.02 \leq e \leq 0.7$, $-0.1 \leq f \leq 0.2$.

In the above-mentioned positive electrode material, the chemical formula of lithium manganate is expressed as $Li_zMn_{2-g}M3_gO_{4-h}$, wherein M3 represents at least one selected from the group consisting of cobalt (Co), nickel (Ni), magnesium (Mg), aluminum (Al), boron (B), titanium (Ti), vanadium (V), chromium (Cr), ferrum (Fe), copper (Cu), zinc (Zn), molybdenum (Mo), tin (Sn), calcium (Ca), strontium (Sr), and tungsten (W), and the values of z, g and h are respectively within the following ranges: $0.8 \leq z \leq 1.2$, $0 \leq g < 1.0$, and $-0.2 \leq h \leq 0.2$.

The negative electrode comprises a negative electrode material capable of intercalation and deintercalation of lithium (Li) (hereinafter, sometimes referred to as "negative electrode material capable of intercalation/deintercalation of lithium (Li)"). Examples of the negative electrode material capable of intercalation/deintercalation of lithium (Li) may include a carbon material, a metal compound, an oxide, a sulfide, a nitride of lithium such as $LiN_3$, lithium metal, a metal which formed an alloy with lithium, and a polymer material.

Examples of carbon materials may include low graphitized carbon, easily graphitized carbon, artificial graphite, natural graphite, mesocarbon microbeads, soft carbon, hard carbon, pyrolytic carbon, coke, glassy carbon, organic polymer compound sintered body, carbon fiber and active carbon. Coke may include pitch coke, needle coke, and petroleum coke. The organic polymer compound sintered body refers to materials obtained by calcining and carbonizing a polymer material such as a phenol plastic or a furan resin at a suitable temperature and, and some of these materials are classified into low graphitized carbon or easily graphitized carbon. Examples of polymeric materials may include polyacetylene and polypyrrole.

Among these negative electrode materials capable of intercalation/deintercalation of lithium (Li), further, materials whose charge and discharge voltages are close to the charge and discharge voltages of lithium metal are selected. This is because of the fact that the lower the charge and discharge voltages of the negative electrode material are, the more easily the battery can have a higher energy density. The carbon material can be selected as the negative electrode material, since the crystal structure of the carbon material has only small changes during charging and discharging. Therefore, good cycle characteristics and high charge and discharge capacities can be obtained. In particular, graphite can be selected, since it can provide a high electrochemical equivalent and energy density.

In addition, the negative electrode material capable of intercalation/deintercalation of lithium (Li) may include elemental lithium metal, metal elements and semi-metal elements capable of forming an alloy together with lithium (Li), alloys and compounds including such elements, etc. In particular, they are used together with the carbon material, since good cycle characteristics and high energy density can be obtained in this case. In addition to alloys comprising two or more metal elements, alloys used herein further include alloys comprising one or more metal elements and one or more semi-metal elements. The alloys may be in the following forms of solid solutions, eutectic crystals (eutectic mixtures), intermetallic compounds, and mixtures thereof.

Examples of metal elements and semi-metal elements may include tin (Sn), lead (Pb), aluminum (Al), indium (In), silicon (Si), zinc (Zn), antimony (Sb), bismuth (Bi), cadmium (Cd), magnesium (Mg), boron (B), gallium (Ga), germanium (Ge), arsenic (As), silver (Ag), zirconium (Zr), yttrium (Y), and hafnium (Hf). Examples of the above-described alloys and compounds may include a material expressed as a chemical formula: $Ma_sMb_tLi_u$, and a material expressed as a chemical formula: $Ma_pMc_gMd_r$. In these chemical formulas, Ma represents at least one of metal elements and semi-metal elements capable of forming alloys with lithium, Mb represents at least one of these metal elements and semi-metal elements other than lithium and Ma, Mc represents at least one of the non-metal elements, Md represents at least one of these metal elements and semi-metal elements other than Ma, and s, t, u, p, q, and r satisfy s>0, t≥0, u≥0, p>0, q>0, and r≥0, respectively.

In addition, an inorganic compound that does not include lithium (Li) may be used in the negative electrode, such as $MnO_2$, $V_2O_5$, $V_6O_{13}$, NiS, and MoS.

The lithium-ion battery described above further comprises an electrolyte, which may be one or more of a gel electrolyte, a solid electrolyte, and an electrolyte. The electrolyte comprises a lithium salt and a non-aqueous solvent.

The lithium salt is one or more selected from the group consisting of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB, and lithium difluoborate. For example, $LiPF_6$ is used as a lithium salt, since it can provide high ionic conductivity and improve cycle performance.

The non-aqueous solvent may be a carbonate compound, a carboxylic acid ester compound, an ether compound, other organic solvents or combinations thereof.

The carbonate compound may be a chain carbonate compound, a cyclic carbonate compound, a fluorinated carbonate compound or combinations thereof.

Examples of chain carbonate compounds include diethyl carbonate (DEC), dimethyl carbonate (DMC), dipropyl carbonate (DPC), methylpropyl carbonate (MPC), ethyl propyl carbonate (EPC), methyl ethyl carbonate (MEC) and combinations thereof. Examples of the cyclic carbonate compounds include ethylene carbonate (EC), propylene carbonate (PC), butylene carbonate (BC), vinyl ethylene carbonate (VEC), and combinations thereof. Examples of the fluorocarbonate compound include fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methylethyl carbonate, 1-fluoro-1-methyl-ethylene carbonate, 1,2-difluoro-1-methylethylene carbonate, 1,1,2-trifluoro-2-methylethyl carbonate, trifluoromethyl ethylene carbonate, and combinations thereof.

Examples of carboxylic acid ester compounds include methyl acetate, ethyl acetate, n-propyl acetate, tert-butyl acetate, methyl propionate, ethyl propionate, γ-butyrolactone, decanolactone, valerolactone, mevalonolactone, caprolactone, methyl formate, and combinations thereof.

Examples of ether compounds include dibutyl ether, tetraethylene glycol dimethyl ether, diethylene glycol dimethyl ether, 1,2-dimethoxyethane, 1,2-diethoxyethane, ethoxy methoxy ethane, 2-methyltetrahydrofuran, tetrahydrofuran, and combinations thereof.

Examples of other organic solvents include dimethyl sulfoxide, 1,2-dioxolane, sulfolane, methyl sulfolane, 1,3-dimethyl-2-imidazolidinone, N-methyl-2-pyrrolidone, formamide, dimethylformamide, acetonitrile, trimethyl phosphate, triethyl phosphate, trioctyl phosphate, phosphate esters, and combinations thereof.

The positive electrode, the separator and the negative electrode are sequentially wound, stacked or folded into an electrode assembly, which is then placed into a packaging shell (for example, an aluminum plastic film), an electrolyte is injected, and the chemical conversion and packaging processes are performed to prepare a lithium-ion battery.

It should be understood by those skilled in the art that the above-described method for preparing a lithium-ion battery is only an example. Other methods commonly used in the art can be used without departing from the disclosure of the present application.

Since the separator is wound or stacked together with the positive electrode and the negative electrode, in a case that the above-described porous layer is formed on the surface of the positive electrode or the negative electrode, a corresponding technical effect can also be achieved.

Some specific examples and comparable examples are listed below to better illustrate this application. In the following examples, reagents, materials, and instruments used are commercially available unless otherwise specified. Some of the parameters used in the examples and comparative examples are shown in Table 1 below.

Comparative Example 1

(1) Preparation of Negative Electrode

The negative electrode active material (artificial graphite), the binder (styrene butadiene rubber), and the conductive agent (conductive carbon black (Super P)) are mixed uniformly with the solvent (deionized water) at a mass ratio of 92:3:5 to prepare a negative electrode slurry, then the negative electrode slurry is coated uniformly on both sides of the negative electrode current collector (copper foil), then a negative electrode active material layer is formed by drying the coated negative electrode current collector (copper foil) at 85 degrees Celsius, then cold pressing, slitting and cutting processes are performed and a negative electrode tab is welded so as to obtain a negative electrode.

(2) Preparation of Positive Electrode

The positive electrode active material (lithium cobaltate ($LiCoO_2$)), the binder (polyvinylidene fluoride (PVDF)), the conductive agent (conductive carbon black (Super P)) are dissolved in the solvent N-methylpyrrolidone (NMP) in a mass ratio of 97:1.5:1.5. A positive electrode slurry is prepared by uniformly stirring the mixture, then the positive electrode slurry is coated uniformly on both sides of the positive electrode current collector (aluminum foil), then a positive electrode active material layer is formed by drying the coated positive electrode current collector (aluminum foil) at 85 degrees Celsius, and then cold pressing, slitting, cutting processes are performed and a positive electrode tab is welded so as to obtain a positive electrode.

(3) Preparation of Separator

Boehmite is mixed with the binder (polyvinylidene fluoride), then the solvent N-methylpyrrolidone is added and the mixture is uniformly stirred to obtain a coating solution, and the volume ratio of the inorganic particles to the binder is 0.8. The coating solution is coated on the porous substrate (polyethylene) by means of dip coating to form a wet film. The porous substrate (polyethylene) with the wet film is immersed into the coagulating solution containing deionized water (third solvent) and N-methylpyrrolidone (second solvent) for phase transformation, with both the coating solution and the coagulating solution being at a temperature of 25 degrees Celsius. After being immersed in the coagulating solution for 30 seconds, the porous substrate (polyethylene) with the wet film is dried in an oven at 60 degrees Celsius to obtain a separator with a porous layer. The mass content of N-methylpyrrolidone (second solvent) in the coagulating solution is 40%. The ratio of Dv90 of the inorganic particles in the porous layer to the thickness of the porous layer is 0.2.

(4) Preparation of Electrolyte

A solution prepared with lithium salt $LiPF_6$ and a non-aqueous organic solvent (ethylene carbonate (EC): diethyl carbonate (DEC): ethyl methyl carbonate (EMC): vinylene carbonate (VC)=8:85:5:2, by a mass ratio) by a mass ratio of 8:92 is used as the electrolyte of the lithium-ion battery.

(5) Preparation of Lithium-Ion Battery

An electrode assembly is obtained by winding the positive electrode, the separator, and the negative electrode, and then sealing, injection of the electrolyte, forming, and suction molding processes are performed to obtain the lithium-ion battery.

Comparative Example 2

Figure 3:
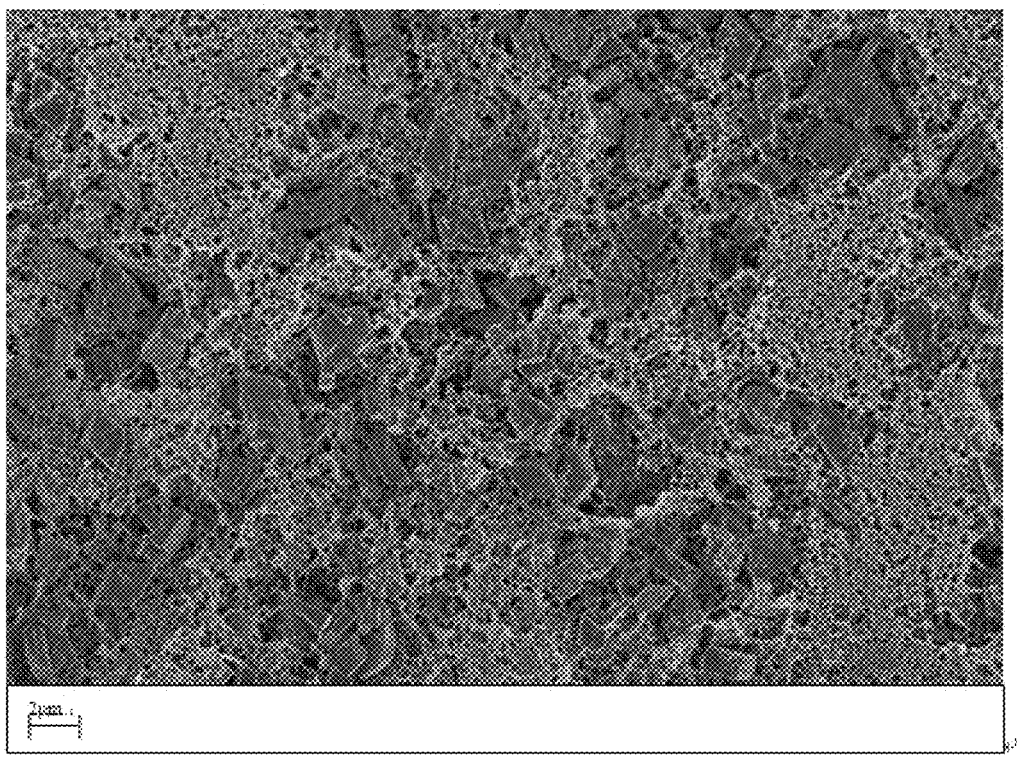
FIG. 3 is an electronic microscope image (3000 times magnification) of pores of the lower surface of the porous layer (i.e., the surface of the porous layer that is away from the porous substrate) in comparative example 2.
Figure 4:
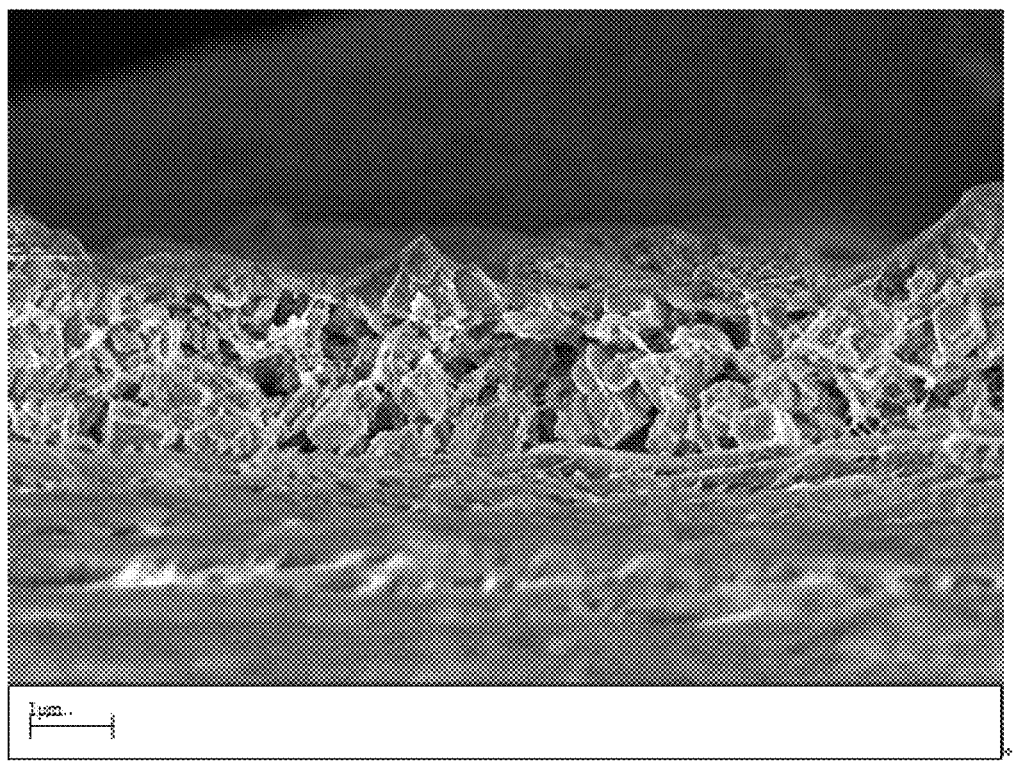
FIG. 4 is an electronic microscope image (10,000 times magnification) of the cross section of the porous layer in the thickness direction in comparative example 2.

The preparation method is the same as that of comparative example 1, except that the ratio of the Dv90 of the inorganic particles in the porous layer to the thickness of the porous layer is 3.2 in comparative example 2. As can be seen in FIGS. 3-4, FIG. 3 is an electronic microscope image (3000 times magnification) of pores of a lower surface of the porous layer in comparative example 2, FIG. 4 is an electronic microscope image (10,000 times magnification) of the cross section of the porous layer in the thickness direction in comparative example 2.

Example 1

The preparation method is the same as that of comparative example 1, except that the ratio of the Dv90 of the inorganic particles in the porous layer to the thickness of the porous layer is 0.3 in Example 1.

Example 2

The preparation method is the same as that of comparative example 1, except that the ratio of the Dv90 of the inorganic particles in the porous layer to the thickness of the porous layer is 0.5 in Example 2.

Example 3

Figure 2:
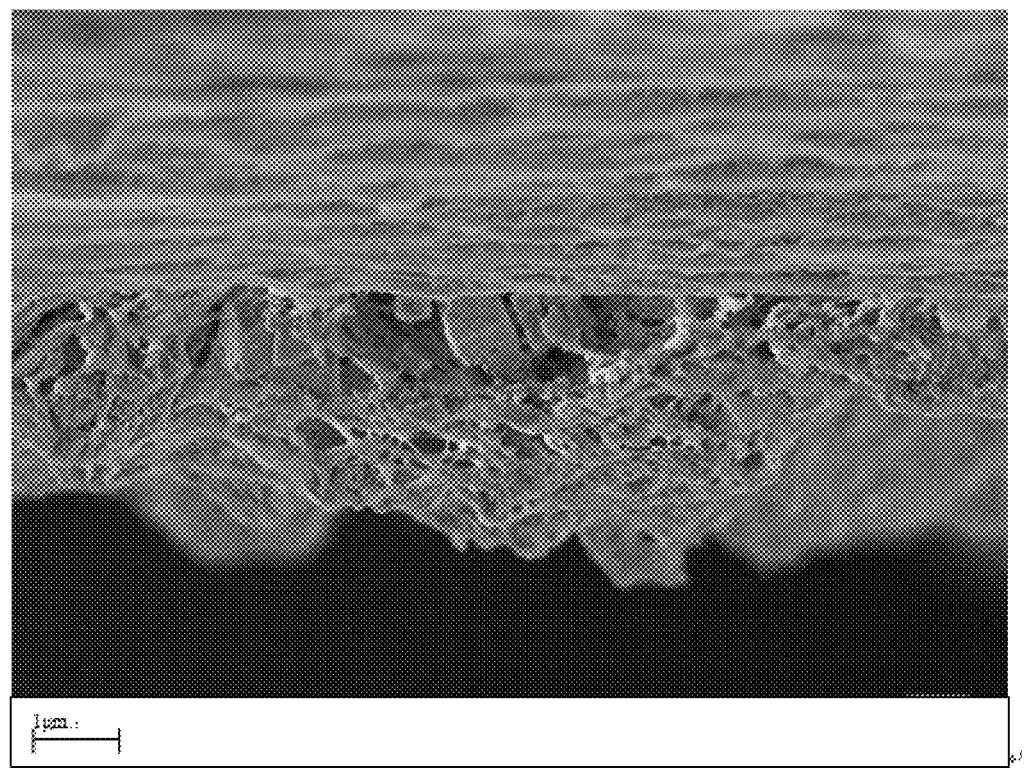
FIG. 2 is an electronic microscope image (10,000 times magnification) of the cross section of the porous layer in the thickness direction in example 3.

The preparation method is the same as that of comparative example 1, except that the ratio of the Dv90 of the inorganic particles in the porous layer to the thickness of the porous layer is 0.8 in Example 3. As can be seen in FIGS. 1-2, FIG. 1 is an electronic microscope image (3000 times magnification) of pores of a lower surface of the porous layer in example 3, FIG. 2 is an electronic microscope image (10,000 times magnification) of the cross section of the porous layer in the thickness direction in example 3.

Example 4

The preparation method is the same as that of comparative example 1, except that the ratio of the Dv90 of the inorganic particles in the porous layer to the thickness of the porous layer is 1.0 in Example 4.

Example 5

The preparation method is the same as that of comparative example 1, except that the ratio of the Dv90 of the inorganic particles in the porous layer to the thickness of the porous layer is 1.5 in Example 5.

Example 6

The preparation method is the same as that of comparative example 1, except that the ratio of the Dv90 of the inorganic particles in the porous layer to the thickness of the porous layer is 2.0 in Example 6.

Example 7

The preparation method is the same as that of comparative example 1, except that the ratio of the Dv90 of the inorganic particles in the porous layer to the thickness of the porous layer is 3.0 in Example 7.

Example 8

The preparation method is the same as that of comparative example 1, except that the ratio of the Dv90 of the inorganic particles in the porous layer to the thickness of the porous layer is 0.8, and the volume ratio of the inorganic particles to the binder is 0.2 in Example 8.

Example 9

The preparation method is the same as that of comparative example 1, except that the ratio of the Dv90 of the inorganic particles in the porous layer to the thickness of the porous layer is 0.8, and the volume ratio of the inorganic particles to the binder is 0.5 in Example 9.

Example 10

The preparation method is the same as that of comparative example 1, except that the ratio of the Dv90 of the inorganic particles in the porous layer to the thickness of the porous layer is 0.8, and the volume ratio of the inorganic particles to the binder is 1.2 in Example 10.

Example 11

The preparation method is the same as that of comparative example 1, except that the ratio of the Dv90 of the inorganic particles in the porous layer to the thickness of the porous layer is 0.8, and the volume ratio of the inorganic particles to the binder is 2 in Example 11.

Example 12

The preparation method is the same as that of comparative example 1, except that the ratio of the Dv90 of the inorganic particles in the porous layer to the thickness of the porous layer is 0.8, and the volume ratio of the inorganic particles to the binder is 3 in Example 12.

Example 13

The preparation method is the same as that of comparative example 1, except that the inorganic particles used in Example 13 are alumina, and the ratio of the Dv90 of the inorganic particles in the porous layer to the thickness of the porous layer is 0.8 in Example 13.

Example 14

The preparation method is the same as that of comparative example 1, except that the inorganic particles used in Example 14 are magnesium hydroxide, and the ratio of the Dv90 of the inorganic particles in the porous layer to the thickness of the porous layer is 0.8 in Example 14.

Example 15

The preparation method is the same as that of comparative example 1, except that the inorganic particles used in Example 15 are titanium oxide, and the ratio of the Dv90 of the inorganic particles in the porous layer to the thickness of the porous layer is 0.8 in Example 15.

TABLE 1

| | Solid content in the coating solution | Types of inorganic particles | Ratio of the Dv90 of the inorganic particles to the thickness of the porous layer | Volume ratio of the inorganic particles to the binder | Coagulating solution | |
|---|---|---|---|---|---|---|
| | | | | | second solvent | content of second solvent |
| Example 1 | 15% | boehmite | 0.3 | 0.8 | NMP | 40% |
| Example 2 | 15% | boehmite | 0.5 | 0.8 | NMP | 40% |
| Example 3 | 15% | boehmite | 0.8 | 0.8 | NMP | 40% |
| Example 4 | 15% | boehmite | 1.0 | 0.8 | NMP | 40% |
| Example 5 | 15% | boehmite | 1.5 | 0.8 | NMP | 40% |
| Example 6 | 15% | boehmite | 2.0 | 0.8 | NMP | 40% |
| Example 7 | 15% | boehmite | 3.0 | 0.8 | NMP | 40% |
| Example 8 | 15% | boehmite | 0.8 | 0.2 | NMP | 40% |
| Example 9 | 15% | boehmite | 0.8 | 0.5 | NMP | 40% |
| Example 3 | 15% | boehmite | 0.8 | 0.8 | NMP | 40% |
| Example 10 | 15% | boehmite | 0.8 | 1.2 | NMP | 40% |
| Example 11 | 15% | boehmite | 0.8 | 2 | NMP | 40% |
| Example 12 | 15% | boehmite | 0.8 | 3 | NMP | 40% |
| Example 3 | 15% | boehmite | 0.8 | 0.8 | NMP | 40% |
| Example 13 | 15% | alumina | 0.8 | 0.8 | NMP | 40% |
| Example 14 | 15% | magnesium hydroxide | 0.8 | 0.8 | NMP | 40% |
| Example 15 | 15% | titanium oxide | 0.8 | 0.8 | NMP | 40% |
| Comparative Example 1 | 15% | boehmite | 0.2 | 0.8 | NMP | 40% |
| Comparative Example 2 | 15% | boehmite | 3.2 | 0.8 | NMP | 40% |

Next, the performances of separator and lithium-ion battery are tested.

(1) Thickness Test of Porous Layer

Separator samples are placed on a thickness gage (Model VL-50 LITEMATIC from Naitutoyo company) using a 5 mm flat bottom probe with a speed of 50 mm/min and a pressure of 0.01N. Each of the separator samples provided with a porous layer is measured for 60 thickness points, and the average thickness is taken as the measured value. The thickness of the porous layer is equal to the thickness of the separator minus the thickness of the porous substrate. In a case that there are two porous films, the thickness is divided by 2 to obtain the thickness of each porous layer.

(2) Gas Permeability Test of Porous Layer

A 100 mm×100 mm separator sample provided with a porous layer is cut and tested using a US Gurley 4110N Densometers with 100 cc test gas, and the period that the test gas passes completely through the separator sample provided with the porous layer is recorded as a Gurley value. The Gurley value of the porous layer is equal to the Gurley value of the separator provided with the porous layer minus the Gurley value of the separator without the porous layer (i.e., a pure porous substrate).

(3) Porosity Test of Porous Layer

The length, width, and thickness of a separator sample provided with a porous layer are measured, and the thickness of the porous layer is obtained by subtracting the thickness of the porous substrate (polyethylene) from the thickness of the separator, and the apparent volume V1 of the porous layer is obtained by calculation. The true volume V20 of the separator sample provided with the porous layer is measured using a true density meter (AccuPyc II Model 1340 Gas Pycnometer, Micromeritics Company), and the true volume V0 of the porous substrate (polyethylene) of the same area is measured. Then, the true volume V2 of the porous layer is equal to V2=V20−V0, and the porosity of the porous layer is equal to 1-V2/V1.

(4) Rate Performance Test of Lithium-Ion Battery

At 25 degrees Celsius, the lithium-ion battery is discharged to 3.0 V at a constant current of 0.2 C, rested for 10 minutes, then is charged to 4.4 V at a constant current of 0.7 C, then is charged to 0.02 C at a constant voltage of 4.4 V, rested for 10 min, and is further discharged at a constant current of 0.2 C until the voltage reaches 3.0 V. The discharge capacity at this time is measured and recorded as Q1. Then, the lithium-ion battery is charged to 4.4V at a constant current of 0.7 C, and then charged to 0.02 C at a constant voltage of 4.4 V, rested for 10 minutes, and then is discharged at a constant current of 2 C until the voltage is 3.0 V. The discharge capacity at this time is measured and recorded as Q2.

2 C/0.2 C rate performance (%) of the lithium-ion battery is equal to Q2/Q1×100%.

(5) Cycle Performance Test of Lithium-Ion Battery

At 25 degrees Celsius, the lithium-ion battery is charged to 4.4 V at a constant current of 0.7 C, then charged to 0.02 C at a constant voltage of 4.4 V, rested for 10 minutes, and discharged to 3.0 V at a constant current of 1 C, rested for 10 minutes. The discharge capacity at this time is measured and recorded as Q3. The above-described steps are regarded as one cycle of charge and discharge. 200 cycles are performed, and the discharge capacity after 200 cycles is recorded as Q4.

The capacity retention rate (%) of the lithium-ion battery after 200 cycles is equal to Q4/Q3×100%.

The test results of examples and comparative examples are shown in Table 2 below.

TABLE 2

| | Porosity of porous layer | Gurley value of porous layer (s/100 cc) | Thickness of porous layer (μm) | 2 C/0.2 C rate performance | Capacity retention rate after 200 cycles |
|---|---|---|---|---|---|
| Example 1 | 48% | 53 | 2 | 79.50% | 85.70% |
| Example 2 | 50% | 42 | 2 | 83.70% | 92.80% |
| Example 3 | 52% | 30 | 2 | 87.50% | 95.60% |
| Example 4 | 53% | 28 | 2 | 84.60% | 93.10% |
| Example 5 | 54% | 25 | 2 | 82.50% | 91.20% |
| Example 6 | 56% | 20 | 2 | 81.70% | 85.20% |
| Example 7 | 57% | 18 | 2 | 80.40% | 82.70% |
| Example 8 | 46% | 57 | 2 | 81.10% | 87.20% |
| Example 9 | 49% | 43 | 2 | 82.80% | 91.70% |
| Example 3 | 52% | 30 | 2 | 87.50% | 95.60% |
| Example 10 | 54% | 25 | 2 | 83.10% | 91.30% |
| Example 11 | 56% | 21 | 2 | 81.50% | 88.80% |
| Example 12 | 59% | 16 | 2 | 79.70% | 83.80% |
| Example 3 | 52% | 30 | 2 | 87.50% | 95.60% |

TABLE 2-continued

|  | Porosity of porous layer | Gurley value of porous layer (s/100 cc) | Thickness of porous layer (μm) | 2 C/ 0.2 C rate performance | Capacity retention rate after 200 cycles |
|---|---|---|---|---|---|
| Example 13 | 50% | 43 | 2 | 84.40% | 92.90% |
| Example 14 | 52% | 31 | 2 | 86.90% | 94.30% |
| Example 15 | 51% | 36 | 2 | 84.10% | 91.30% |
| Comparative Example 1 | 45% | 70 | 2 | 69.80% | 70.50% |
| Comparative Example 2 | 60% | 16 | 2 | 71.30% | 72.60% |

As can be seen from a comparison among examples 1-7 and comparative examples 1-2, the ratio of Dv90 of the inorganic particles to the thickness of the porous layer has an effect on the rate performance and cycle performance of the lithium-ion battery, and the probability of pore blockage due to compression swelling in the porous layer can be reduced effectively by controlling the ratio of the Dv90 of the inorganic particles to the thickness of the porous layer to be in a range from 0.3 to 3.0, so that the rate performance and cycle performance of the lithium-ion battery can be effectively improved. If the ratio of Dv90 of the inorganic particles to the thickness of the porous layer is too high (for example, comparative example 2), the pore size distribution of the porous layer tends to be non-uniform, the surface of the porous layer is heterogeneous, the porous layer is easily detached from the surface of the porous substrate, and defects are formed in the energy storage device (such as a lithium-ion battery), which is not advantageous for the improvement on rate performance and cycle performance. In addition, if the ratio of Dv90 of the inorganic particles to the thickness of the porous layer is too high, the adhesive force of the porous layer is reduced relatively, affecting the safety performance of the energy storage device (such as a lithium-ion battery). If the ratio of Dv90 of the inorganic particles to the thickness of the porous layer is too low (for example, comparative example 1), the inorganic particles cannot be effectively exposed on the surface of the porous layer, which does not facilitate an exchange of the first solvent in the coating solution and the third solvent in the coagulating solution in the preparation process of the porous layer, cannot enhance diffusion, is not advantageous for the development of the pores, and is also not advantageous for the improvement of the rate performance and cycle performance.

As can be seen from the comparison among Example 3 and Examples 8-12, the volume ratio of inorganic particles to the binder has an effect on the rate performance and cycle performance of the lithium-ion battery. An increase of the volume ratio is advantageous for an exchange of the third solvent in the coagulating solution and the first solvent in the coating solution and the increase of the porosity of the porous layer. If the volume ratio of inorganic particles to the binder is too low, the porosity of the porous layer is decreased, the gas permeability of the separator deteriorates, and the rate performance of the lithium-ion battery is not significantly improved, which is not advantageous for the improvement of the rate performance and cycle performance. If the ratio of the volume ratio of the inorganic particles to the binder is too high, the adhesive force of the porous layer is reduced, gaps are easily formed between the separator and the electrodes, the hardness of the lithium-ion battery is reduced, and thus the rate performance and the cycle performance are not significantly improved.

As can be seen from the comparison among Example 3 and Examples 13-15, the use of various inorganic particles can improve the rate performance and cycle performance of the lithium-ion battery, and the types of inorganic particles used have less effect on the rate performance and cycle performance of the lithium-ion battery.

It should be understood by those skilled in the art that the above-described examples are only illustrative examples and should not be construed limiting the application. The various changes, substitutions, and alterations could be made to the application without departing from the spirit and scope of the application.

What is claimed is:

1. An energy storage device, comprising a separator, the separator comprising:
    a porous substrate; and
    a porous layer arranged on a surface of the porous substrate, wherein the porous layer comprises inorganic particles and a binder, and a ratio of Dv90 of the inorganic particles to the thickness of the porous layer is in a range from 0.4 to 1.5.

2. The energy storage device according to claim 1, wherein the ratio of Dv90 of the inorganic particles to the thickness of the porous layer is in a range from 0.5 to 1.0.

3. The energy storage device according to claim 2, wherein the ratio of Dv90 of the inorganic particles to the thickness of the porous layer is in a range from 0.5 to 0.8.

4. The energy storage device according to claim 1, wherein the ratio of Dv90 of the inorganic particles to the thickness of the porous layer is in a range from 0.8 to 1.5.

5. The energy storage device according to claim 4, wherein the ratio of Dv90 of the inorganic particles to the thickness of the porous layer is in a range from 0.8 to 1.0.

6. The energy storage device according to claim 4, wherein the ratio of Dv90 of the inorganic particles to the thickness of the porous layer is in a range from 1.0 to 1.5.

7. The energy storage device according to claim 1, wherein the porous layer has a thickness of 0.2 μm to 10 μm.

8. The energy storage device according to claim 1, wherein the porous layer has pores formed by the binder, and the inorganic particles are distributed in the pores.

9. The energy storage device according to claim 8, wherein the pores have an average pore size of 0.3 μm to 20 μm.

10. The energy storage device according to claim 1, wherein a volume ratio of the inorganic particles to the binder is in a range from 0.2 to 3.0.

11. The energy storage device according to claim 10, wherein a volume ratio of the inorganic particles to the binder is in a range from 0.5 to 3.0.

12. The energy storage device according to claim 11, wherein a volume ratio of the inorganic particles to the binder is in a range from 0.8 to 2.0.

13. The energy storage device according to claim 12, wherein a volume ratio of the inorganic particles to the binder is in a range from 0.8 to 1.2.

14. The energy storage device according to claim 1, wherein the porous layer has a porosity of 20% to 90%.

15. The energy storage device according to claim 1, wherein the inorganic particles contain a polar functional group, the polar functional group is hydroxyl group.

16. The energy storage device according to claim 1, wherein the inorganic particles are one or more selected from the group consisting of alumina, silica, magnesia, titanium oxide, hafnium dioxide, tin oxide, zirconia, cerium dioxide, nickel oxide, zinc oxide, calcium oxide, boehmite, aluminum hydroxide, magnesium hydroxide, calcium hydroxide, and barium sulfate.

17. The energy storage device according to claim 1, wherein the binder is one or more selected from the group consisting of polyvinylidene fluoride, vinylidene fluoride-hexafluoropropylene copolymer, polyamide, polyacrylonitrile, polyacrylate, polyacrylic acid, polyacrylates, sodium carboxymethylcellulose, polyvinylpyrrolidone, polyvinyl ether, polymethyl methacrylate, polytetrafluoroethylene and polyhexafluoropropylene.

18. The energy storage device according to claim 1, the energy storage device is a lithium-ion battery, the lithium-ion battery further comprises a positive electrode, a negative electrode and an electrolyte.

19. An energy storage device, comprising a separator, the separator comprising:
   a porous substrate; and
   a porous layer arranged on a surface of the porous substrate, wherein the porous layer comprises inorganic particles and a binder, and a ratio of Dv90 of the inorganic particles to the thickness of the porous layer is in a range from 0.5 to 1;
   wherein the porous layer has pores formed by the binder, and the inorganic particles are distributed in the pores.

20. An energy storage device, comprising a separator, the separator comprising:
   a porous substrate; and
   a porous layer arranged on a surface of the porous substrate, wherein the porous layer comprises inorganic particles and a binder, and a ratio of Dv90 of the inorganic particles to the thickness of the porous layer is in a range from 0.5 to 0.8;
   wherein the porous layer has pores formed by the binder, and the inorganic particles are distributed in the pores.

21. The energy storage device according to claim 1, wherein the inorganic particles are boehmite.

* * * * *